(12) United States Patent
Cogan et al.

(10) Patent No.: US 10,003,508 B1
(45) Date of Patent: Jun. 19, 2018

(54) EVENT-BASED SYSTEM, METHOD, AND COMPUTER PROGRAM FOR INTERVENING IN A NETWORK SERVICE

(71) Applicant: Amdocs Development Limited, Limassol (CY)

(72) Inventors: Peter John Cogan, Dublin (IE); Roman Ferrando Llopis, Dublin (IE); Paul Andrew Ferguson, Dublin (IE)

(73) Assignee: Amdocs Development Limited, Limassol (CY)

( * ) Notice: Subject to any disclaimer, the term of this patent is extended or adjusted under 35 U.S.C. 154(b) by 94 days.

(21) Appl. No.: 14/954,860

(22) Filed: Nov. 30, 2015

(51) Int. Cl.
*H04L 12/24* (2006.01)
*H04L 12/26* (2006.01)

(52) U.S. Cl.
CPC .......... *H04L 41/5061* (2013.01); *H04L 43/04* (2013.01); *H04L 43/062* (2013.01); *H04L 43/10* (2013.01)

(58) Field of Classification Search
CPC ... H04L 41/5061; H04L 43/062; H04L 43/10; H04L 43/04; H04L 41/50; H04L 41/5064; H04L 41/5067; H04L 41/507; H04L 41/5074
See application file for complete search history.

(56) References Cited

U.S. PATENT DOCUMENTS

| | | | |
|---|---|---|---|
| 6,714,893 B2 | 3/2004 | Busche et al. | |
| 7,032,016 B2 | 4/2006 | Cerami et al. | |
| 7,542,995 B2 | 6/2009 | Thampy et al. | |
| 8,326,576 B2 | 12/2012 | Pun | |
| 8,521,572 B2 | 8/2013 | Hanson et al. | |
| 8,565,411 B2 | 10/2013 | Kannan et al. | |
| 8,938,749 B2 | 1/2015 | Yang et al. | |
| 2006/0167825 A1 | 7/2006 | Sayal | |
| 2006/0241957 A1 | 10/2006 | Boswell | |
| 2007/0165818 A1 | 7/2007 | Savoor et al. | |
| 2007/0239740 A1 | 10/2007 | Thampy et al. | |
| 2011/0119517 A1* | 5/2011 | Beeco | H04L 41/0677 713/340 |
| 2011/0158398 A1 | 6/2011 | Kannan et al. | |
| 2011/0161020 A1 | 6/2011 | Pun | |
| 2011/0314145 A1* | 12/2011 | Raleigh | H04L 41/0893 709/224 |
| 2013/0188496 A1* | 7/2013 | Hong | H04W 24/00 370/241 |

(Continued)

FOREIGN PATENT DOCUMENTS

WO 2008057812 A2 5/2008
WO 2014043623 A1 3/2014

*Primary Examiner* — Feben M Haile
(74) *Attorney, Agent, or Firm* — Zilka-Kotab, PC (57) ABSTRACT

An event-based system, method, and computer program product are provided for intervening in connection with a network service. A plurality of measurements are identified that correspond to at least one aspect of a network service. Such measurements are processed and it is determined whether a criterion has been met, based on the processing. One or more events are identified based on the determination whether the criterion has been met. Further, the one or more events are aggregated, and at least one record is produced, based on the aggregation. To this end, an intervention is carried out in connection with the network service, based on the at least one record.

13 Claims, 9 Drawing Sheets

(56) References Cited

U.S. PATENT DOCUMENTS

2013/0198767 A1\* 8/2013 Wang ................ H04L 65/80
                                                          725/14
2014/0218542 A1   8/2014 Blair et al.
2017/0195487 A1\* 7/2017 Bellosi ............. H04M 3/5175

\* cited by examiner

EVENT-BASED SYSTEM, METHOD, AND COMPUTER PROGRAM FOR INTERVENING IN A NETWORK SERVICE

FIELD OF THE INVENTION

The present invention relates to networks, and more particularly to intervening in a network service.

BACKGROUND

Network service providers deploy large volumes of equipment in homes and businesses to facilitate the delivery of television, internet, and phone services. This equipment, typically referred to as customer premises equipment (CPE) can comprise remote gateways, set-top boxes, digital video recorder (DVR) devices, etc. A typical deployment for a large network service provider could result in many variations and configurations of such devices installed in a variety of manners.

Maintenance of these devices is especially difficult since the service provider cannot physically access the devices without attending a customer premises, which is prohibitively expensive. Further, these devices typically reside in uncontrolled environments with an unpredictable exposure to environmental conditions, usage patterns, and other external parameters, which can impact performance. If the device starts to malfunction as a result of these unpredictable effects, a customer will experience degraded experience which may trigger a call or other communication with a call center, etc. operated by the network service provider. This, in turn, may lead to degraded customer satisfaction, unnecessary technical dispatches, and even disconnections.

There is thus a need for addressing these and/or other issues associated with the prior art.

SUMMARY

An event-based system, method, and computer program product are provided for intervening in connection with a network service. A plurality of measurements are identified that correspond to at least one aspect of a network service. Such measurements are processed and it is determined whether a criterion has been met, based on the processing. One or more events are identified based on the determination whether the criterion has been met. Further, the one or more events are aggregated, and at least one record is produced, based on the aggregation. To this end, an intervention is carried out in connection with the network service, based on the at least one record.

DETAILED DESCRIPTION

Figure 1:
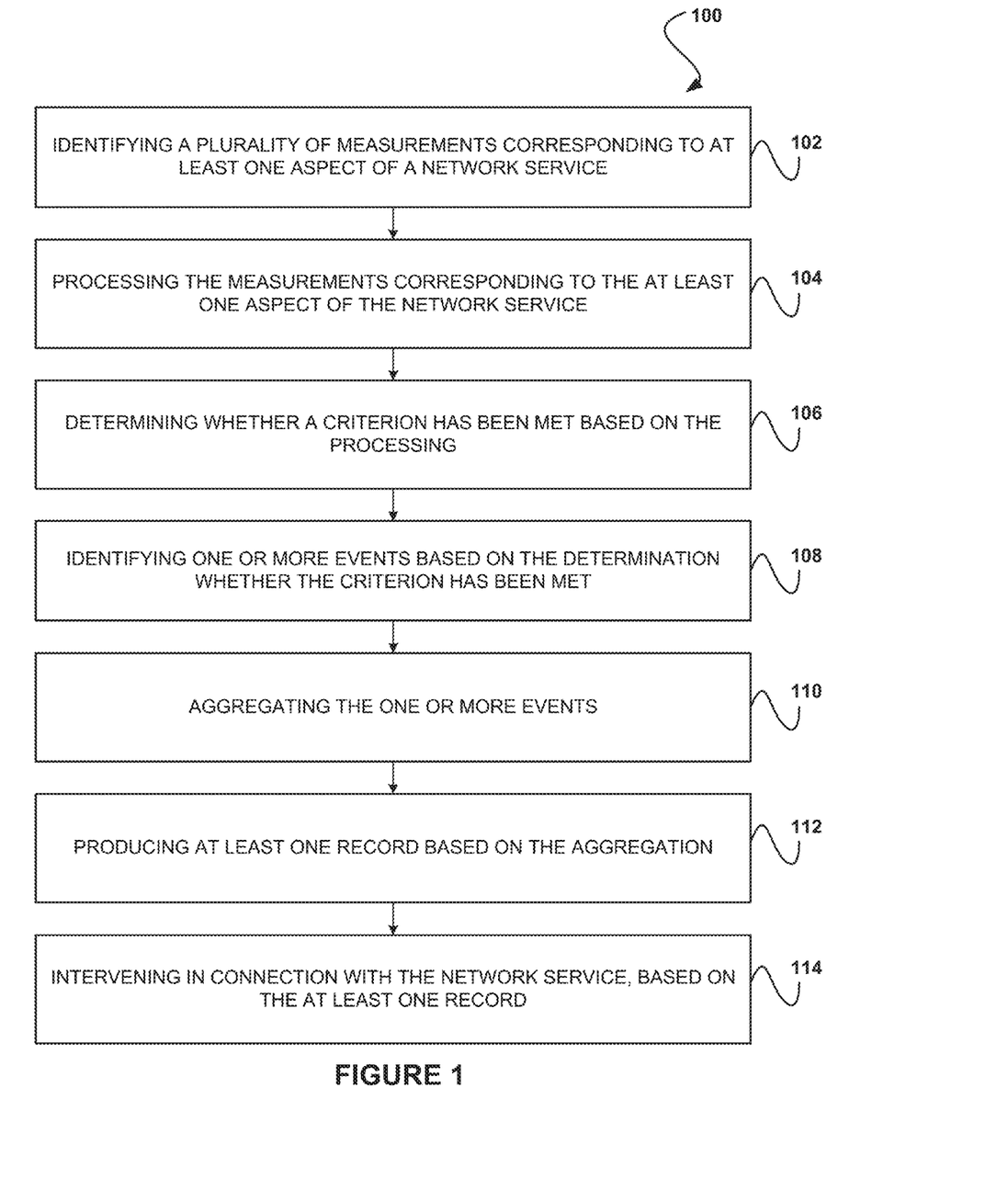
FIG. 1 illustrates a method for intervening in connection with a network service, in accordance with one embodiment.

FIG. 1 illustrates a method 100 for intervening in connection with a network service, in accordance with one embodiment. As shown in operation 102, a plurality of measurements are identified which correspond to at least one aspect of a network service. In the context of the present description, such measurements may refer to any data, indication, and/or result (or derivation thereof) associated with a measurement. Further, such measurements may be identified by way of any technique that results in the measurement becoming known. For example, the measurement may be received, looked-up, calculated, determined, inferred, and/or ascertained via any other technique resulting in the identification of the measurement.

Still yet, in various optional embodiments, the at least one aspect may include an upload speed, a download speed, a ping time, a latency, a number of dropped packets, a number of dropped frames, a digital rights management (DRM) error, and/or absolutely any other aspect capable of being measured in connection with the network service. Further, the network service may be provided in connection with any type of one or more networks. For instance, in various embodiments, the network(s) may include one or more wireless networks (e.g. 802.11, cellular, LTE, LTE-Advanced, etc.), optical networks, hardwire networks, the Internet, and/or any network, for that matter (or combination thereof).

As indicated in operation 104, the measurements corresponding to the at least one aspect of the network service are processed. In the context of the present description, such processing may refer to any one or more operations on the measurements that enable one or more criterion to be determined. For example, in one exemplary embodiment, the processing may serve to identify one or more events based on any criterion that is determined based on the processing.

To this end, in operation 106, it is determined whether a criterion has been met based on the processing. In the present description, such criterion may refer to anything that can be detected via the measurements and/or processing thereof, for the purpose of identifying events in connection with the network service. Just by way of example, in one embodiment, the criterion may refer to one or more thresholds that may be triggered based on one or more measurements. Of course, in other optional embodiments, more complex criterion are contemplated in the form of algorithms involving state machines, Boolean or other types of logic, etc.

One or more events may thus be identified based on the determination whether the criterion has been met. See operation 108. In the present description, such event(s) may refer to any occurrence that is capable of being tracked, logged, or otherwise electronically documented for subsequent use. Further, the event(s) may be identified by way of any technique that results in the event(s) becoming known. For example, the event(s) may be received, looked-up, calculated, determined, inferred, and/or via any ascertained utilizing any other technique resulting in the identification of the event(s).

Moving to operation 110, the one or more events are aggregated. Such aggregation, in the present description, may refer to any collection of events that allows production of at least one record. To this end, as indicated in operation 112, at least one record is produced based on the aggregation. Such record may refer to any computer-readable data structure that is based on the aforementioned aggregation.

By this design, operation 114 provides for an intervention in connection with the network service, based on the at least one record. Such intervention may refer to any action capable of being taken by the network service provider or any other entity working under the control of or in combination with the network service provider. Just by way of example, the intervention may include contacting at least one customer via a call center by way of any type of communication (e.g. phone call, e-mail, text, web communication, etc.) before such customer contacts the network service provider.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

For example, in various embodiments, the method 100 may optionally be applied in the context of a system whereby the aforementioned events may be derived from continuous measurements (e.g. based on network service metrics, etc.) and further be aggregated with other events (e.g. failure, failure recovery events, etc.) and other static information (e.g. customer profile information, network topology information, etc.). By aggregating such events/information in such manner, a system may more intelligently determine when to intervene in connection with a service being provided to a customer, by better predicting when such customer is likely to contact the service provider, and taking actions prior in order to avoid such contact.

Figure 2:
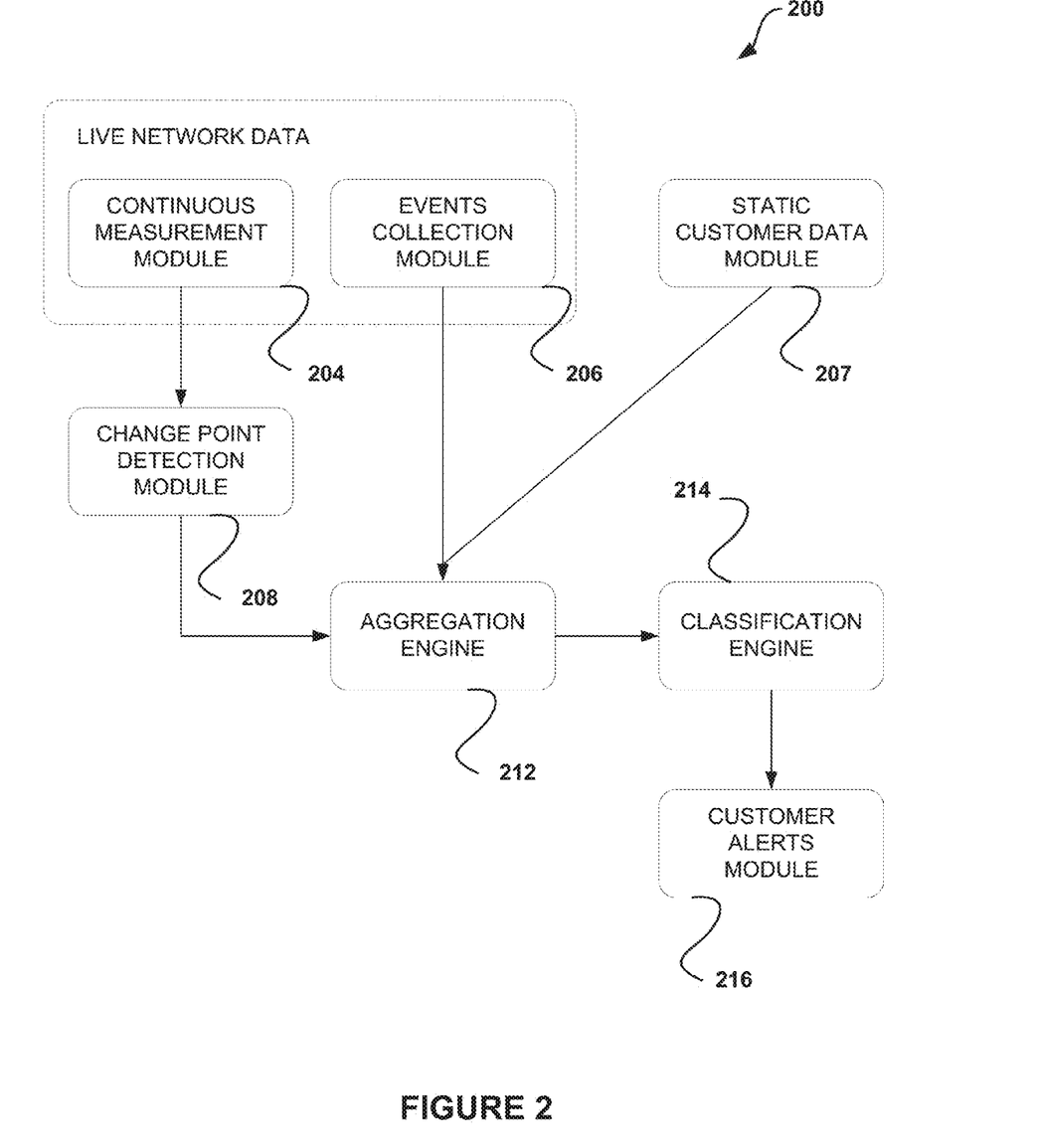
FIG. 2 illustrates an event-based system for intervening in a network service, in accordance with one embodiment.

FIG. 2 illustrates a event-based system 200 for intervening in a network service, in accordance with one embodiment. As an option, the event-based system 200 may be implemented in the context of the details of FIG. 1 and/or any subsequent figure(s). Of course, however, the event-based system 200 may be implemented in the context of any desired environment. Further, the aforementioned definitions may equally apply to the description below.

As shown, included is a continuous measurement module 204 that is capable of continuously measuring one or more aspects of a network service. As mentioned earlier, in various embodiments, such aspects may include an upload speed, a download speed, a ping time, a latency, a number of dropped packets, a number of dropped frames, a digital rights management (DRM) error, etc. In one possible embodiment, the continuous measurement module 204 may measure any aspect that is capable of being measured continuously (i.e. at a predetermined sample rate, etc.), whereby such continuous measurement results in different results much of the time (e.g. a majority of the time, etc.), depending on the sampling rate.

Also provided is an events collection module 206 that identifies events that are more random and less-occurring in nature, thus providing additional information beyond that collected by the continuous measurement module 204. For example, in one embodiment, such events collection module 206 may identify a failure (e.g. disaster, etc.) or a failure recovery event. Of course, the events collection module 206 may identify any events that are detectable at the time of such occurrence.

In the context of a failure event, a device may fail spontaneously. When the device reboots, it may send a diagnostic data package back to a core network containing a time of the failure and a type of the failure. Such time/type information may be provided at a high level information of detailed diagnostics logs and crash traces, which are often proprietary and encrypted. When a failure occurs, there may be a temporary disruption to the service provided by the device, which can provide, for example, a television service, internet service and telephone service. Further, such failures may be caused for many reasons such as programming errors, signaling errors, memory corruption, configuration issues, environmental issues, faulty firmware updates, etc.

Failure recovery typically follows a failure. When a device experiences a disaster recovery (which may be initiated by a user with physical access to the device) a new version of device firmware may downloaded and installed on the device. In some cases, this can result in the DVR information being deleted from the device (similar to a factory reset—but with the latest version of the firmware installed).

In one embodiment, the aforementioned events identified by the events collection module 206 may be detected by receiving a signal from a mechanism (included or separate from the events collection module 206) that triggers upon the associated event occurring. To this end, the events collection module 206 is reactionary (in response to the events), while the continuous measurement module 204 proactively takes measurements on a more continuous or pseudo-continuous basis (again, based on the sampling rate).

Further provided is a static customer data module 207 that collects additional information in the form of static information. In various embodiments, such static information may include a customer demographic, a customer billing history, a customer network service usage history, a customer call history, customer product information, customer tenure information, customer value information, and/or customer status information. In other embodiments, the static information may include network topology information including, but not limited to equipment information (e.g. manufacturer, model, firmware revision, device age, etc.), network information (e.g. technology, loop length, etc.), etc.

By this design, the modules 204, 206, and 207 collectively provide multiple different types of information for use in more intelligently intervening in connection with a network service. Specifically, such different types of information may include a first type that result from continuous measurement (via module 204), a second type that results from random events (via module 206), and a third type that is more static in nature (via module 207).

With continuing reference to FIG. 2, the continuous measurement module 204 feeds a change point detection module 208. Such change point detection module 208 serves to process the continuous measurements from the continuous measurement module 204 and produce events based on whether one or more thresholds are met.

To this end, an aggregation engine 212 is capable of receiving input from each of the change point detection module 208, the events collection module 206, and the static customer data module 207 for the purpose of aggregating such information. In one embodiment that will be described later in greater detail, the information from each of the aforementioned modules 206, 207, and 208 are aggregated into at least one record. As an option, such at least one record may take the form of a vector.

Further provided is an on-line classification engine 214 that is in communication with the aggregation engine 212. In use, the on-line classification engine 214 serves to process the at least one record from the aggregation engine 212 for determining a likelihood of at least one customer contacting the network service provider. In doing so, the on-line classification engine 214 outputs an indication of a probability that such customer(s) will contact the network service provider given the state of the network service/customer profile (via aforementioned modules 206, 207, and 208), and the past behavior of the customer(s).

In various embodiments, the on-line classification engine 214 may include a machine learning engine that is trained offline based on prior historical data. Using such historical data, vectors may be created using the previously described modules (but for training purposes). These vectors may also be labeled by examining historical call center data. More information regarding such labeling will be set forth during the description of subsequent embodiments.

Also provided is a customer alert(s) module 216 that is in communication with the on-line classification engine 214. In operation, the customer alert(s) module 216 is capable of processing the output of the on-line classification engine 214 (that is a function of the aforementioned probabilities) utilizing any desired business logic. In one embodiment, such logic, in turn, triggers intervention (e.g. actions, etc.) in connection with the network service based on the aforementioned probability-driven output of the on-line classification engine 214.

Just by way of example, if the foregoing probability-driven output triggers a first threshold, an automated repair mechanism may be executed for minimizing any underlying issue that resulted in an increased probability of a call center call. Further, if the foregoing probability-driven output triggers a second, higher threshold, an automated message may be sent to the customer(s) with self-repair/remediation guidance. Both of the foregoing actions are considered non-exhaustive examples of network service intervention.

To this end, the on-line classification engine 214 and customer alert(s) module 216 together are capable of ingesting the record(s) in the form of a vector and apply a previously-trained machine learning classification model to determine whether a customer is likely to contact a call center. If the algorithm determines that a call is likely, an automated message may be delivered to the customer directing them to a self-help guide and/or engage in any other action (e.g. fixes for network service issue(s), etc.) that, in turn, reduces the chances that the customer(s) will contact the call center. To this end, resources of the network service provider and/or associated call center may be saved.

Figure 3:
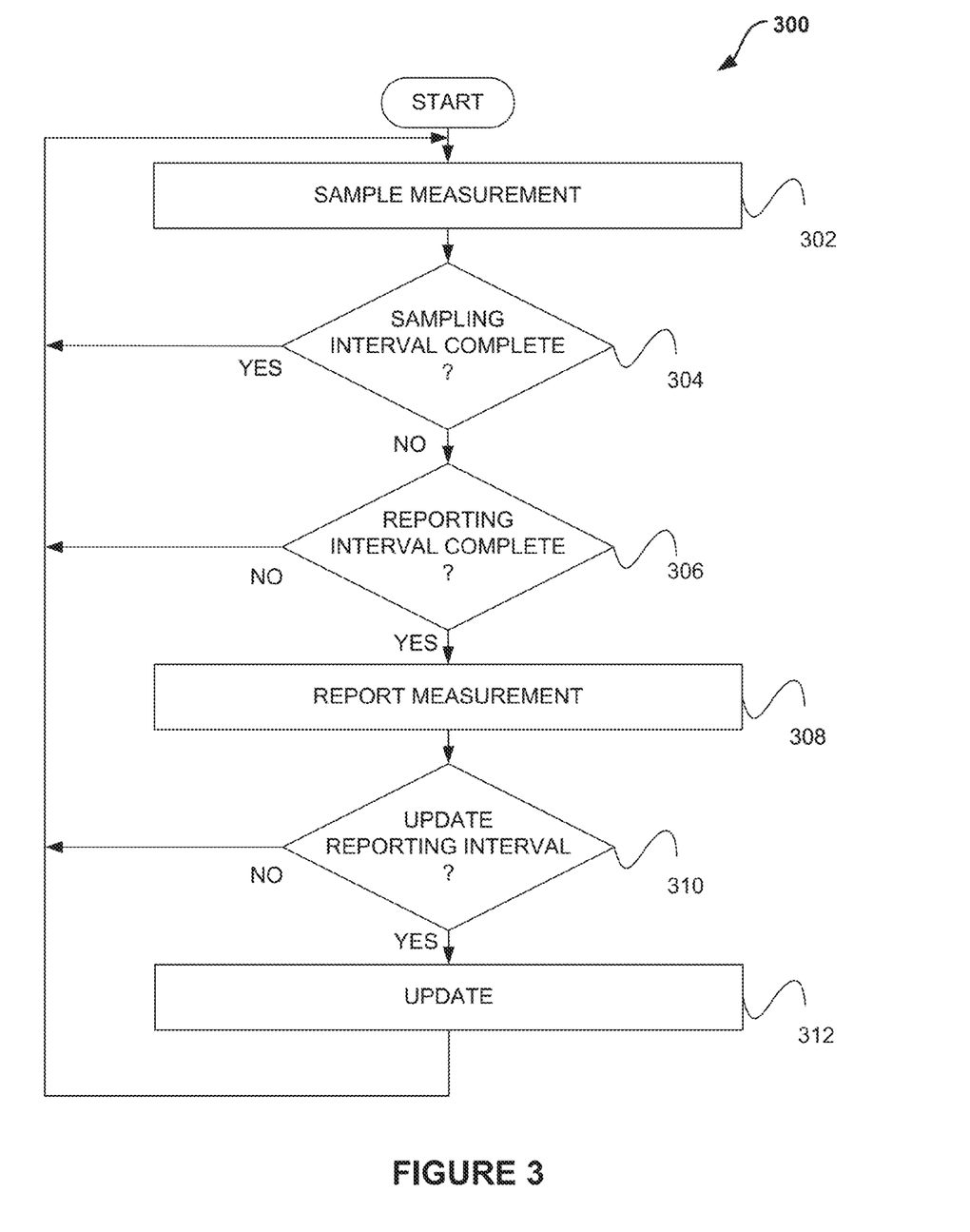
FIG. 3 illustrates a method for continuously measuring at least one aspect of a network service, in accordance with one embodiment.

FIG. 3 illustrates a method 300 for continuously measuring at least one aspect of a network service, in accordance with one embodiment. As an option, the method 300 may be implemented in the context of the details of any previous and/or subsequent figure(s). For example, the method 300 may be implemented in the context of the continuous measurement module 204 of FIG. 2. Of course, however, the method 300 may be implemented in the context of any desired environment. Further, the aforementioned definitions may equally apply to the description below.

As shown, a measurement is sampled in operation 302. In one embodiment, this may be accomplished by reading or receiving an output of a detection mechanism that is suited for continuously monitoring a particular aspect of the network service. As dictated by decision 304, the sampling of operation 302 may be repeated upon the cessation of a predetermined sampling interval.

As indicated by decision 306 and operation 308, the measurements may be sampled at a first rate, while being reported at a second rate. In one embodiment, the sampling interval may be smaller than the reporting interval. To this end, multiple sampled measurements may be reported via the reporting interval. As an option, such multiple sampled measurements may be aggregated, compressed, and/or otherwise processed to reduce network bandwidth consumption in connection with such reporting.

Further, such reporting interval may even be updated based on network conditions and/or an amount of overhead that is added by way of the reporting of operation 308. See decision 310 and operation 312. To this end, the aforementioned second rate (associated with reporting) is capable of being updated based on any desired predetermined criteria.

Figure 4:
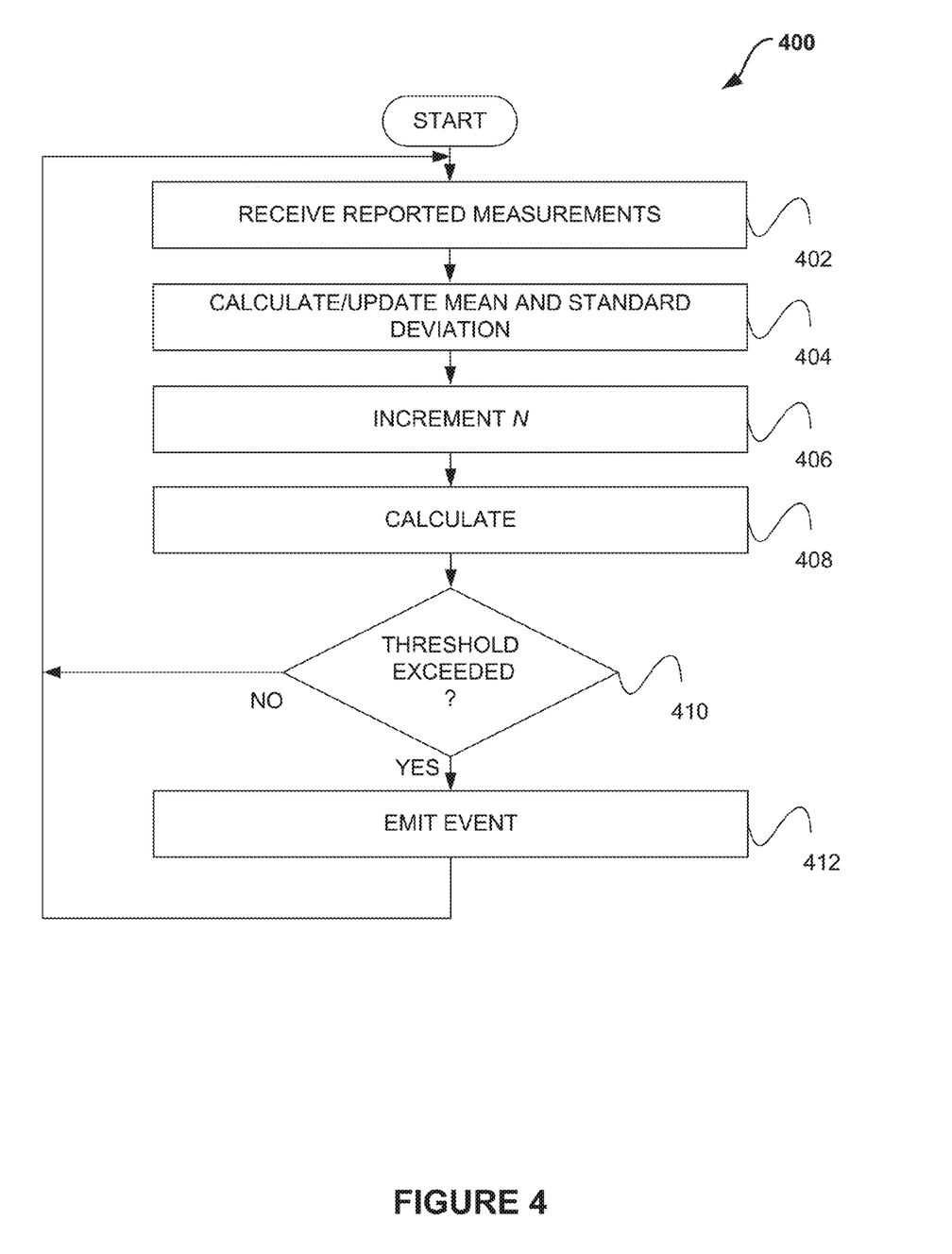
FIG. 4 illustrates a method for change point detection, in accordance with one embodiment.

FIG. 4 illustrates a method 400 for change point detection, in accordance with one embodiment. As an option, the method 400 may be implemented in the context of the details of any previous and/or subsequent figure(s). For example, the method 400 may be implemented in the context of the change point detection module 208 of FIG. 2, and/or may follow the method 300 of FIG. 3. Of course, however, the method 400 may be implemented in the context of any desired environment. Further, the aforementioned definitions may equally apply to the description below.

In operation 402, reported measurements are received. In one embodiment, such measurement reporting may result from operation 308 of FIG. 3. As each reported measurement is received, a mean and standard deviation is calculated (or updated) in connection with the reported measurement. Note operation 404. Still yet, a factor "N" is incremented (e.g. by "1" for each calculation, etc.). See operation 406. To this end, a calculation is performed for the purpose of determining whether one or more thresholds are met. See operation 408 and decision 410. If such thresholds are met per decision 410, an event may be emitted per operation 412.

In one embodiment, such operations 408, 412 and decision 410 may be governed by Algorithm #1 below.

If $|x_i - \bar{x}| > \alpha \sigma_x$ and $N > N_{min}$                                     Algorithm #1 emit event
    reset $\bar{x}$ and $\sigma_x$
    reset N=0,
    where:
        $x_i$ is the continuous measurement data
        $\bar{x}$ is the mean
        $\sigma_x$ is the standard deviation
        $\alpha$ and $N_{min}$ are tunable parameters By this design, the processing of the method 400 results in a plurality of statistics that are repeatedly updated for repeated determination as to whether the criterion has been met (see decision 410). In various embodiments, the aforementioned statistics may include a minimum, maximum, average, median, standard deviation and/or any other statistics, for that matter. Further, in one possible embodiment, the measurement sampling may be measured in seconds (e.g. 60 seconds, etc.) and the reporting interval may be measured in minutes (e.g. 15 minutes, etc.).

In some optional embodiments, at least one parameter of the processing is capable of being tuned based on user input. For example, the aforementioned parameter $\alpha$ determines how large of a step change is required before an event is emitted. In one embodiment, each stream of events may have its own parameter $\alpha$. Another tunable parameter includes the minimum number of points $N_{min}$ that are to be counted before an event can be emitted.

Figure 5:
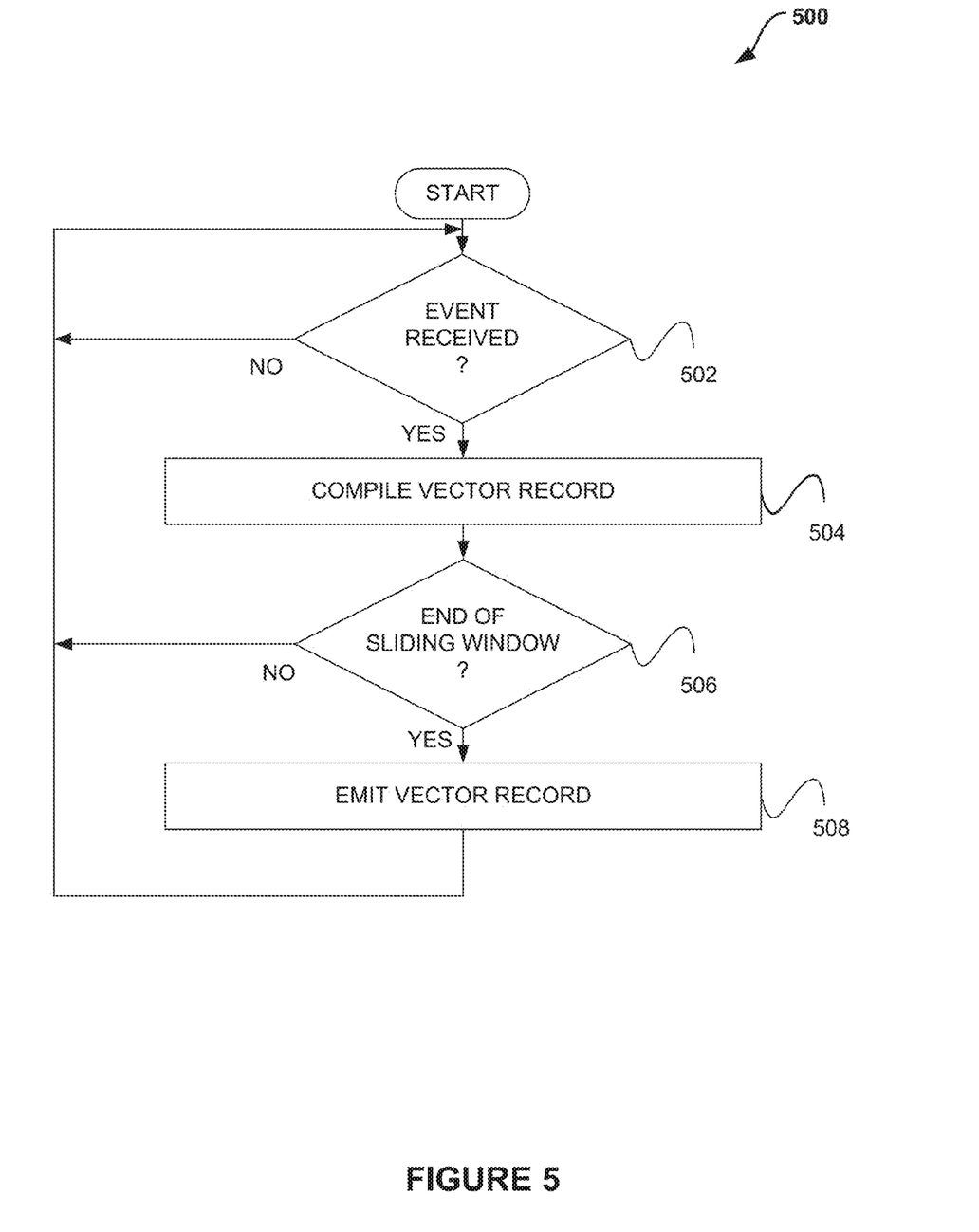
FIG. 5 illustrates a method for time-dependent event aggregation, in accordance with one embodiment.

FIG. 5 illustrates a method 500 for time-dependent event aggregation, in accordance with one embodiment. As an option, the method 500 may be implemented in the context of the details of any previous and/or subsequent figure(s). For example, the method 500 may be implemented in the context of the aggregation engine 212 of FIG. 2, and/or may follow the method 400 of FIG. 4. Of course, however, the method 500 may be implemented in the context of any desired environment. Further, the aforementioned definitions may equally apply to the description below.

As shown, it is first determined whether an event has been received. Note decision 502. In the context of an embodiment involving the system 200 of FIG. 2, the events may be received from modules 204, 206, for example. Further, in the context of an embodiment involving the method 400 of FIG. 4, the events may be received as a result of operation 412.

Per operation 504, a vector record may be compiled, utilizing the events. For example, the vector record may include a plurality of fields that correspond to various information that may be included with and/or gleaned from the events (or even static information). To this end, the appropriate fields of the vector may be filled or generated using the events/static information.

During use, each vector record is compiled over a fixed (or variable) sliding time window. To this end, the vector record may be built using any events (and/or static information updates) that are identified/received within the sliding time window until the end of such time window is reached. See decision 506. Once such end of the sliding time window is reached per decision 506, the vector record may be emitted. See operation 508.

Figure 6:
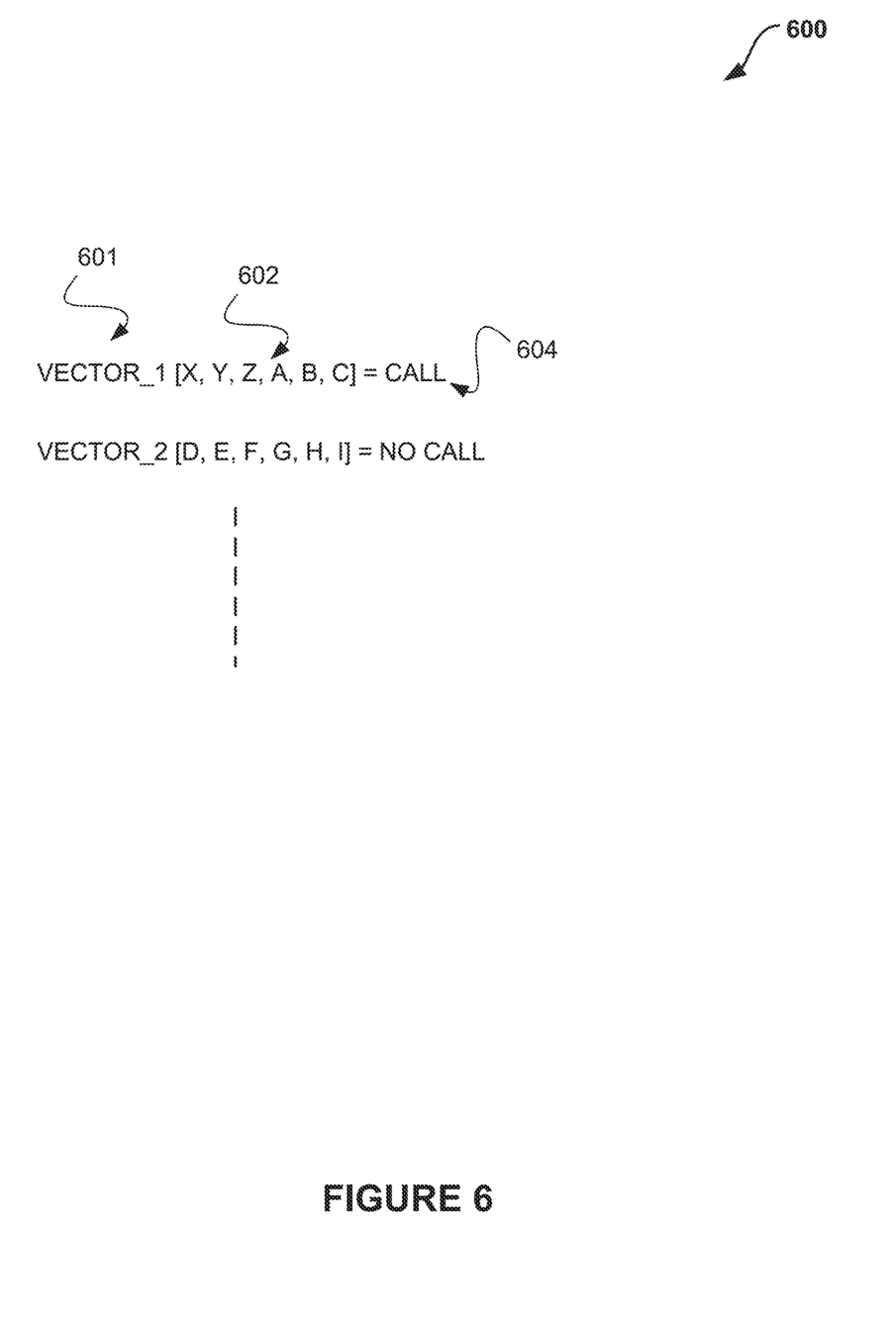
FIG. 6 illustrates a vector record data structure for use by a classification engine, in accordance with one embodiment.

FIG. 6 illustrates a vector record data structure 600 for use by a classification engine, in accordance with one embodiment. As an option, the data structure 600 may be implemented in the context of the details of any previous and/or subsequent figure(s). For example, the data structure 600 may be implemented in the context of the on-line classification engine 214 of FIG. 2.

As shown, the vector record data structure 600 may include a plurality of vector records 601 which may, in turn, include a plurality fields 602. As mentioned earlier, the fields 602 of the vector records 601 may be generated based on: one or more events resulting from continuous measurement and/or random failure-related events identified, and static customer profile information.

Still yet, the vector records 601 may include a label 604 indicating whether the values of the fields 602 have historically indicated that at least one customer is likely to call or otherwise contact a call center given the conditions reflected by the field values. To this end, an on-line classification engine (see engine 214 of FIG. 2, for example) may use such vector record data structure 600 to process new vector records by comparing the fields thereof to those in the vector record data structure 600, to determine a probability of a customer call.

As mentioned earlier, in various embodiments, the aforementioned on-line classification engine may include a machine learning engine that is trained offline based on prior historical data, and the vector records may be labeled by examining historical call center data. For example, if a customer contacts a call center within 1 hour of a certain vector configuration, such vector record is thus labeled (e.g. "Call").

In various embodiments, any machine learning algorithm may be employed that is capable of binary classification (e.g. Bayesian classifier, random forest, etc.). As mentioned earlier, there are several inputs to the model including the values of and for each continuous measure. In various embodiments, such parameters may be adjusted iteratively during the training phase to maximize model accuracy. In some optional embodiments, optimization methods such as stochastic gradient descent, where the objective function is model efficiency, may be used to achieve this, as well.

Figure 7:
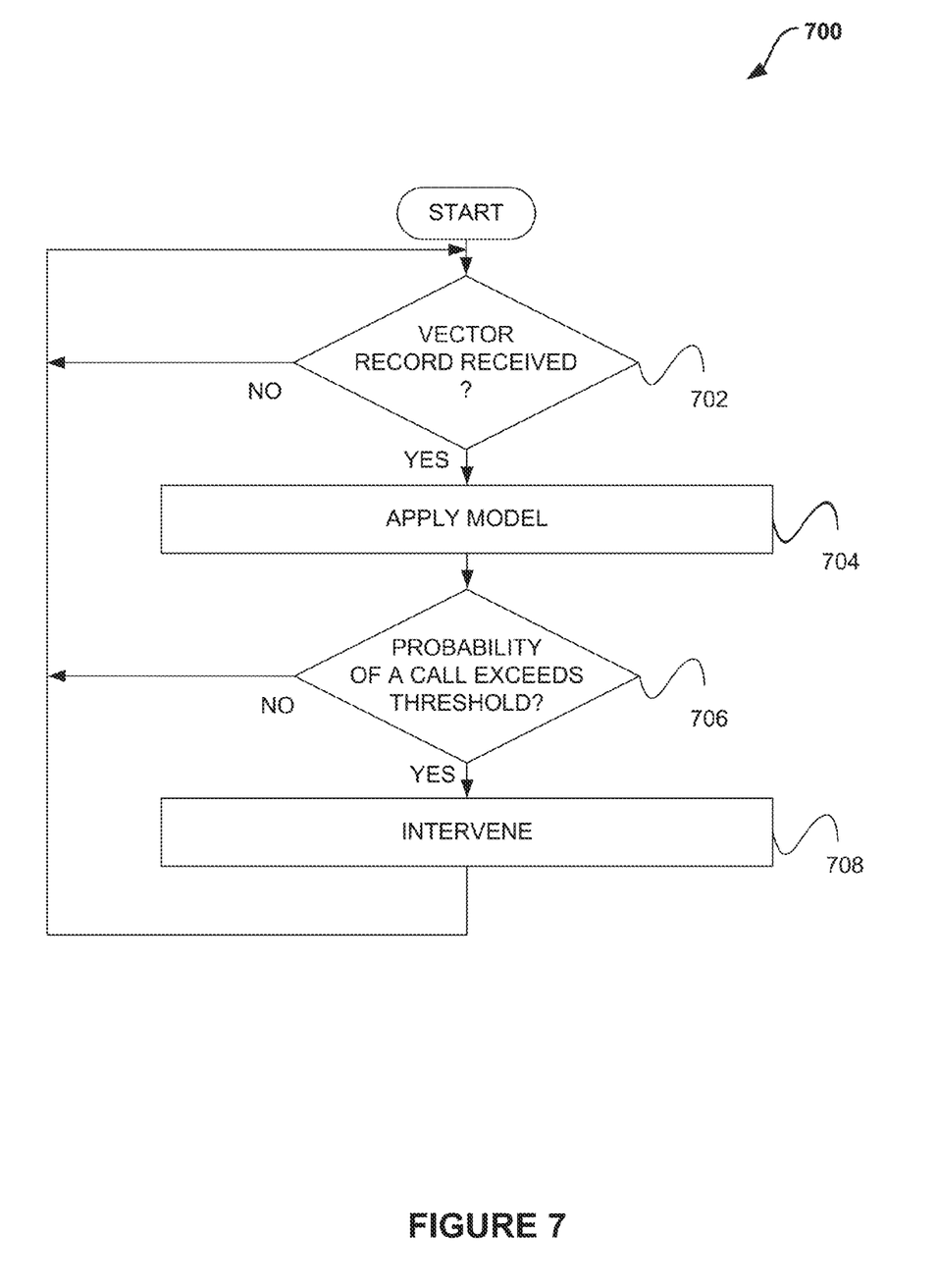
FIG. 7 illustrates a method for event classification and intervention, in accordance with one embodiment.

FIG. 7 illustrates a method 700 for event classification and intervention, in accordance with one embodiment. As an option, the method 700 may be implemented in the context of the details of any previous and/or subsequent figure(s). For example, the method 700 may be implemented in the context of the classification engine 214 and/or customer alert(s) module 216 of FIG. 2, and/or may follow the method 500 of FIG. 5. Of course, however, the method 700 may be implemented in the context of any desired environment. Further, the aforementioned definitions may equally apply to the description below.

As shown, the method 700 begins by the receipt of a vector record. See decision 702. In the context of an embodiment involving the system 200 of FIG. 2, the vector record may be received from the aggregation engine 212, for example. Further, in the context of an embodiment involving the method 500 of FIG. 5, the vector record may be received as a result of operation 508.

Next, in operation 704, a model may be applied to the received vector record. As mentioned earlier, such model may utilize a data structure that is capable of interpreting vector records based on previously stored vector records that were constructed using historical data and labeled as having a (high) probability of a call result or a lack thereof. See, for example, the vector record data structure 600 of FIG. 6.

As indicated in decision 706, it is then determined whether the probability of a call exceeds a threshold or not. In the context of an embodiment involving the system 200 of FIG. 2, such determination may be executed by the customer alert(s) module 216, for example.

If it is determined that the probability of a call exceeds the threshold per decision 706, intervention is carried out. See operation 708. As mentioned earlier, this may be accomplished by contacting at least one customer before such customer contacts a provider of the network service. If not, however, the method 700 continues processing vector records.

Thus, the techniques of various embodiments disclosed herein may be useful in environments where customers may be more likely to call a call center in a predictable manner if they hitherto had excellent service, but there is a sudden and unexpected degradation in that service. Of course, it is contemplated that other customers may benefit, as well. As mentioned earlier, the intervention of operation 708 may take any form. For example, access may be provided to online self-help guides including manuals, instructional videos and live chat interfaces (which may be cheaper than call centers to operate) which, if used by the customer, may potentially render unnecessary any contact to the call center to mitigate any issue. Other options for self-help may include installation and configuration advice, instructions to install/use flash firmware, instructions to mitigate environmental issues (e.g. overheating), etc. In any case, a methodology is provided to detect a change in a customer experience in order to automatically intervene and appropriately direct a customer (or take other actions) to mitigate device issues.

Figure 8:
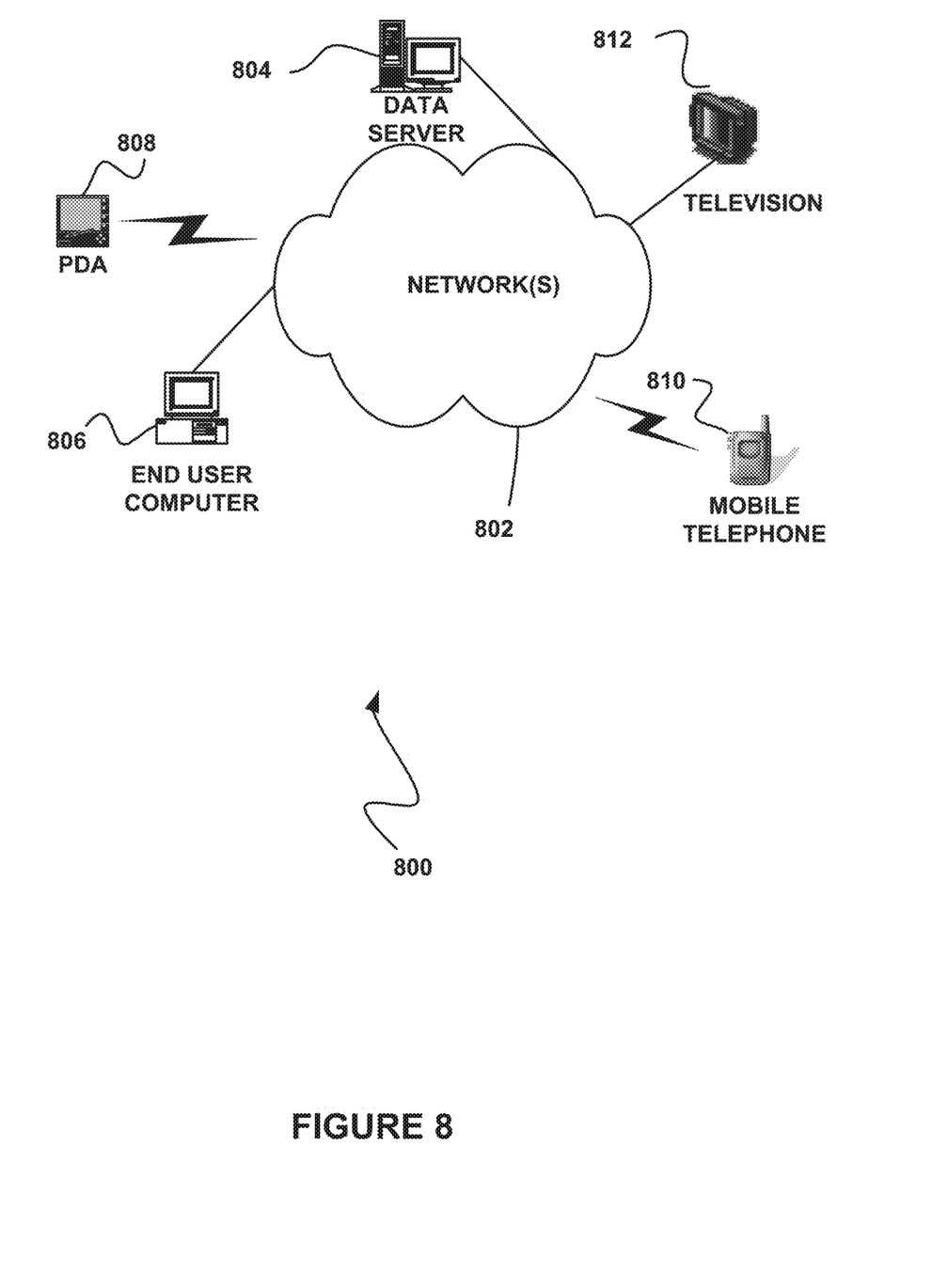
FIG. 8 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 9:
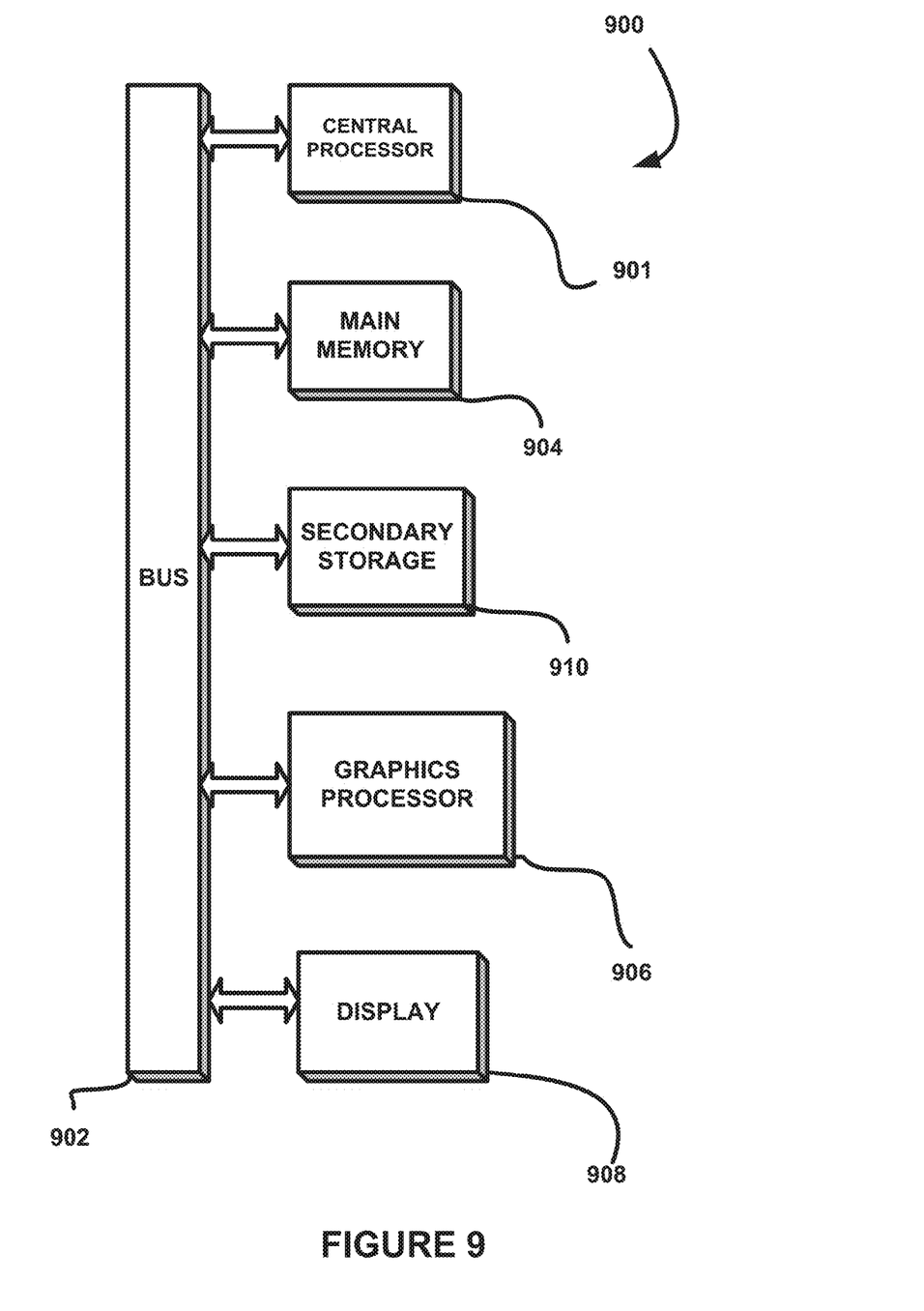
FIG. 9 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:
   identifying a plurality of measurements corresponding to at least one aspect of a network service;
   processing the measurements corresponding to the at least one aspect of the network service;
   determining that a criterion has been met based on the processing;
   identifying one or more events based on the determination that the criterion has been met, the one or more events being indicative of a change in a customer's experience with the network service;
   aggregating the one or more events with information describing:
      a specific failure detected within the network service, and
      network topology information associated with the customer that includes equipment and network information;
   producing at least one record based on the aggregation, wherein the at least one record is stored in a vector having previous records produced from prior measurements corresponding to the at least one aspect of the network service, wherein each of the previous records is labeled in the vector when the call center is called in association with a configuration of data in the previous record;
   applying a previously-trained machine learning classification model to the at least one record to determine that the customer is likely to contact a call center as a result of the change in the customer's experience with the network service, wherein the previously-trained machine learning classification model uses the previous records having the labels to determine from the at least one record that the customer is likely to contact a call center as a result of the change in the customer's experience with the network service; and
   automatically intervening in connection with the network service, based on the determination that the customer is likely to contact a call center, including executing an automated repair mechanism for minimizing an underlying issue that resulted in the change in the customer's experience with the network service.

2. The computer program product of claim 1, wherein the computer program product is configured such that the measurements are identified by being sampled at a first rate and reported at a second rate.

3. The computer program product of claim 2, wherein the computer program product is configured such that the second rate is capable of being updated based on a predetermined criteria.

4. The computer program product of claim 1, wherein the computer program product is configured such that the at least one aspect of the network service includes at least one of a upload speed, a download speed, a ping time, a latency, a number of dropped packets, a number of dropped frames, or a digital rights management (DRM) error.

5. The computer program product of claim 1, wherein the computer program product is configured such that the processing results in a plurality of statistics including at least one of a minimum value, a maximum value, an average value, a median value, or a standard deviation value.

6. The computer program product of claim 1, wherein the computer program product is configured such that the processing results in a plurality of statistics that are repeatedly updated for repeated determination as to whether the criterion has been met.

7. The computer program product of claim 1, wherein the computer program product is configured such that at least one parameter of the processing is capable of being tuned based on user input.

8. The computer program product of claim 1, wherein the change in the customer's experience with the network service is a sudden and unexpected degradation in the network service.

9. The computer program product of claim 1, wherein the computer program product is configured such that the at least one record corresponds to a predetermined sliding window.

10. The computer program product of claim 9, wherein the computer program product is configured such that a plurality of fields of the at least one record are generated based on the one or more events that are identified during the predetermined sliding window.

11. The computer program product of claim 9, wherein the computer program product is configured such that a plurality of fields of the at least one record are generated based on: the one or more events identified during the predetermined sliding window-and the information.

12. A method, comprising:
   identifying a plurality of measurements corresponding to at least one aspect of a network service;
   processing the measurements corresponding to the at least one aspect of the network service;
   determining that a criterion has been met based on the processing;
   identifying one or more events based on the determination that the criterion has been met, the one or more events being indicative of a change in a customer's experience with the network service;
   aggregating the one or more events with information describing:
      a specific failure detected within the network service, and network topology information associated with the customer that includes equipment and network information;

producing at least one record based on the aggregation, wherein the at least one record is stored in a vector having previous records produced from prior measurements corresponding to the at least one aspect of the network service, wherein each of the previous records is labeled in the vector when the call center is called in association with a configuration of data in the previous record;

applying a previously-trained machine learning classification model to the at least one record to determine that the customer is likely to contact a call center as a result of the change in the customer's experience with the network service, wherein the previously-trained machine learning classification model uses the previous records having the labels to determine from the at least one record that the customer is likely to contact a call center as a result of the change in the customer's experience with the network service; and automatically intervening in connection with the network service, based on the determination that the customer is likely to contact a call center, including executing an automated repair mechanism for minimizing an underlying issue that resulted in the change in the customer's experience with the network service.

13. A system, comprising:

one or more hardware processors for:

identifying a plurality of measurements corresponding to at least one aspect of a network service;

processing the measurements corresponding to the at least one aspect of the network service;

determining that a criterion has been met based on the processing;

identifying one or more events based on the determination that the criterion has been met, the one or more events being indicative of a change in a customer's experience with the network service;

aggregating the one or more events with information describing:
  a specific failure detected within the network service, and
  network topology information associated with the customer that includes equipment and network information;

producing at least one record based on the aggregation, wherein the at least one record is stored in a vector having previous records produced from prior measurements corresponding to the at least one aspect of the network service, wherein each of the previous records is labeled in the vector when the call center is called in association with a configuration of data in the previous record;

applying a previously-trained machine learning classification model to the at least one record to determine that the customer is likely to contact a call center as a result of the change in the customer's experience with the network service, wherein the previously-trained machine learning classification model uses the previous records having the labels to determine from the at least one record that the customer is likely to contact a call center as a result of the change in the customer's experience with the network service; and automatically intervening in connection with the network service, based on the determination that the customer is likely to contact a call center, including executing an automated repair mechanism for minimizing an underlying issue that resulted in the change in the customer's experience with the network service.

* * * * *